US010484763B1

(12) United States Patent  
Leigh

(10) Patent No.: US 10,484,763 B1  
(45) Date of Patent: Nov. 19, 2019

(54) OPTICAL INTER-SWITCH LINK CLUSTER

(71) Applicant: Hewlett Packard Enterprise Development LP, Houston, TX (US)

(72) Inventor: Kevin B. Leigh, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/041,669

(22) Filed: Jul. 20, 2018

(51) Int. Cl.  
    *H04Q 11/00*     (2006.01)  
    *H04B 10/80*     (2013.01)

(52) U.S. Cl.  
CPC ......... *H04Q 11/0005* (2013.01); *H04B 10/80* (2013.01); *H04Q 11/0003* (2013.01); *H04Q 2011/0052* (2013.01)

(58) Field of Classification Search  
CPC ........... H04Q 11/0005; H04Q 11/0003; H04Q 2011/0052; H04B 10/80  
See application file for complete search history.

(56) References Cited

U.S. PATENT DOCUMENTS

| | | | | |
|---|---|---|---|---|
| 8,954,698 | B2* | 2/2015 | Schenfeld | G06F 12/0292 711/147 |
| 9,014,567 | B2* | 4/2015 | Tan | G02B 6/43 398/141 |
| 9,164,250 | B2 | 10/2015 | Mogul et al. | |
| 9,348,791 | B2* | 5/2016 | Colgan | G06F 15/161 |
| 9,693,124 | B2* | 6/2017 | Robinson | H04J 14/0212 |
| 2009/0097797 | A1* | 4/2009 | Kewitsch | G02B 6/3502 385/17 |
| 2013/0322838 | A1* | 12/2013 | Julien | H04Q 1/025 385/135 |
| 2015/0063771 | A1 | 3/2015 | Mogul et al. | |
| 2018/0262292 | A1* | 9/2018 | Dangui | H04B 10/2916 |

OTHER PUBLICATIONS

Chen, Z. et al.; "A Hierarchical Optical Network-on-Chip using Central-Controlled Subnet and Wavelength Assignment"; Dec. 11, 2013; 3 pages.  
Li, H. et al.; "A Hierarchical Cluster-based Optical Network-on-Chip"; Jun. 28, 2010; 3 pages.  
Senko, "Micro Board Mount Connector", available online at <http://www.senko.com/literature/MBMC%20-%20Micro%20Board%20Mount%20Connector%20Handout.pdf>, Aug. 28, 2016, 2 pages.

* cited by examiner

*Primary Examiner* — Mina M Shalaby  
(74) *Attorney, Agent, or Firm* — Sheppard Mullin Richter & Hampton LLP

(57) ABSTRACT

An optical inter-switch link cluster includes an array of first switch trays and an array of second switch trays. The array of first switch trays is arranged in a first orientation. Each of the first switch trays includes a plurality of first switch chips and connected to each other, and a plurality of first optical connectors are connected to the plurality of first switch chips. The array of second switch trays is arranged in a second orientation. Each of the second switch trays includes a plurality of second switch chips disposed thereon and connected to each other, and a plurality of second optical connectors are connected to the plurality of second switch chips. Each of the plurality of first optical connectors connected to each of the first switch trays is connected to one of the plurality of second optical connectors of a different one of the plurality of second switch trays.

18 Claims, 8 Drawing Sheets

| Switches | Switch Trays | Switches per Tray | Intersectional | Shuffle Tray | In-tray |
|---|---|---|---|---|---|
| 16 | 2x2 | 4 | 1 | 2 | 3, 4 |
| 32 | 2x2 | 8 | 1 | 2 | 3, 4, 5 |
| 32 | 4x4 | 4 | 1 | 2, 3 | 4, 5 |
| 32 | 8x8 | 2 | 1 | 2, 3, 4 | 5 |
| 64 | 4x4 | 8 | 1 | 2, 3 | 4, 5, 6 |
| 64 | 8x8 | 4 | 1 | 2, 3, 4 | 5, 6 |
| 128 | 8x8 | 8 | 1 | 2, 3, 4 | 5, 6, 7 |
| 128 | 16x16 | 4 | 1 | 2, 3, 4, 5 | 6, 7 |

FIG. 8

OPTICAL INTER-SWITCH LINK CLUSTER

BACKGROUND

External optical cables and shuffle boxes are used to provide complex connection topologies for systems, such as server systems. As chips have started integrating photonics for optical connections in place of electrical connections, optical fiber shuffles that support such optical connections and provide intra-system connectivity are more in demand. Conventional optical fiber shuffles typically include an optical patch panel. The optical patch panel includes multiple connectors and optical fibers routed between each of an independent optical connector for an optical cable and a shuffling box disposed in the optical patch panel. In an optical connection topology, all-to-all optical connections are employed, such that signal routing can be achieved with simpler and easier to service optical switches at lower costs.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 8 is a chart illustrating variations of different connection manners at different hierarchical levels according to some embodiments.

DETAILED DESCRIPTION

Figure 1:
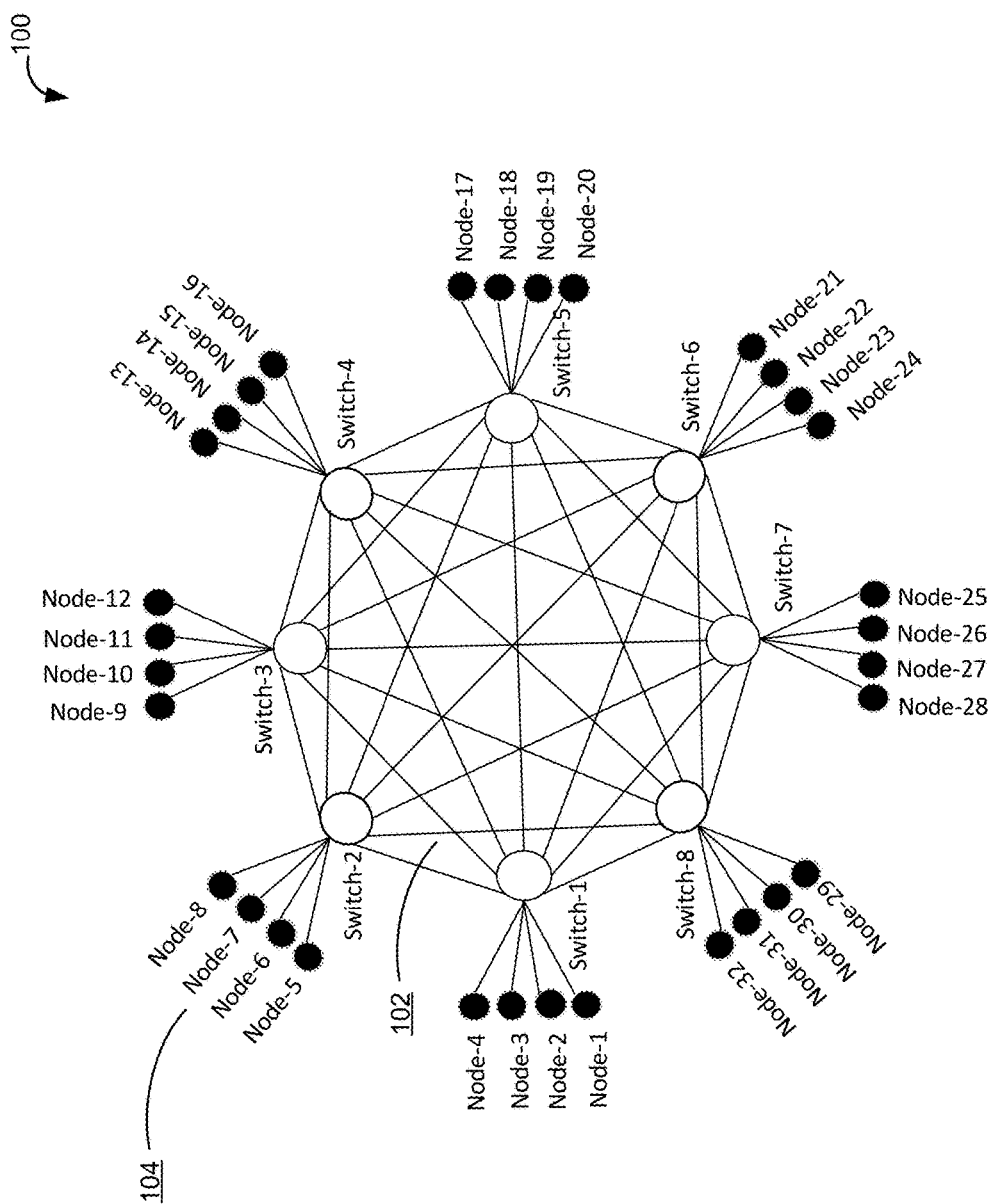
FIG. 1 is a schematic diagram illustrating an example topology achieving all-to-all connections of optical inter-links of switches in an ISL cluster according to some embodiments.

Various embodiments described herein are directed to an optical inter-switch link (ISL) cluster, and a method for establishing optical connections within the ISL cluster. Conventional ISL clusters require larger, cumbersome, and expensive components to establish optical connections among switches. Further, as the number of switches becomes larger, the use of larger, more cumbersome, and expensive components become more prevalent. Therefore, establishing optical connections without relying on such conventional ISL clusters is preferred. To solve this technical issue, an ISL cluster according to some embodiments employs a plurality of switch trays each including a plurality of switch chips therein, and establishes inter connection of the switch trays. The ISL cluster according to some embodiments requires smaller and less components than the conventional ISL clusters, and thus can be manufactured with lower cost. Also, the ISL cluster according to some embodiments enables all-to-all optical connections without significant change of configuration thereof.

An ISL cluster according to some embodiments includes an array of first switch trays and an array of second switch trays. The array of first switch trays is arranged in a first orientation. Each of the first switch trays includes a plurality of first switch chips disposed thereon and connected to each other, and a plurality of first optical connectors are connected to the plurality of first switch chips. The array of second switch trays is arranged in a second orientation. The second orientation may be different from the first orientation. Each of the second switch trays includes a plurality of second switch chips disposed thereon and connected to each other, and a plurality of second optical connectors are connected to the plurality of second switch chips. Each of a plurality of first optical connectors connected to each of the first switch trays is connected to one of the plurality of second optical connectors of different one of the plurality of second switch trays.

In some embodiments, the ISL cluster may further include a first shuffle tray arranged along the array of first switch trays, and a second shuffle tray arranged along the array of second switch trays. The first shuffle tray may include a plurality of optical cables configured to connect each of the plurality of second switch chips on a first part of the second switch trays to all of the plurality of second switch chips on a second part of the second switch trays. The second shuffle tray may include a plurality of optical cables configured to connect each of the plurality of first switch chips on a first part of the first switch trays to all of the plurality of first switch chips on a second part of the first switch trays.

In some embodiments, each switch chip in the plurality of first switch chips the plurality of second switch may be connected to all of the other switch chips and establish all-to-all connections. In some embodiments, the number of the plurality of first switch chips in the array of first switch trays may be equal to the number of the plurality of second switch chips in the array of second switch trays. In some embodiments, the number of the first switch trays may be equal to the number of the second switch trays. In some embodiments, each of the first switch trays may further include one or more external optical connectors for connection with one or more server nodes. Also, each of the second switch trays further may include one or more external optical connectors for connection with one or more server nodes.

A computing system according to some embodiments includes a plurality of server computing devices and an ISL cluster according to some embodiments. A method for establishing all-to-all optical connections among a plurality of switches according to some embodiments includes implementing a hierarchical connection of switches. Specifically, the hierarchical connection of switches includes establishing all-to-all switch connections among switches in multiple groups of a highest hierarchical level, establishing all-to-all switch connections among switches in each of multiple groups in the next highest hierarchical level, and repeating the same establishment of connection until all-to-all switch connections are established in the lowest hierarchical level.

Compared to a conventional ISL cluster, and a conventional computing system and method for establishing connection using the conventional ISL cluster, the ISL cluster, the computing system, or the method for establishing connection according to some embodiments achieve the intended connection with simpler and smaller structures with less cost. Further, the ISL cluster, the computing system, or the method for establishing connection according to some embodiments is highly scalable and adaptable to a smaller to a larger number of switches without changing the configuration extensively.

FIG. 1 is a schematic diagram 100 illustrating an example topology achieving all-to-all connections of optical inter-links of switches according to some embodiments. In the example shown in FIG. 1, the example topology includes all-to-all optical inter-switch link (ISL) cluster 102 and a plurality of nodes 104 connected to each of the switches included in the all-to-all ISL cluster 102. In the example of FIG. 1, the all-to-all ISL cluster 102 represents connection among a plurality of switches in an all-to-all manner. In some embodiments, all-to-all connections mean that each switch in an ISL cluster has a direct connection to all the other switches in the ISL cluster without passing thorough any other switches. In the present disclosure, in achieving the all-to-all connections of switches, an ISL cluster with hierarchical connections of switches is employed. Depending on the specific implementation, a redundant connection may exist, which means that a plurality of optical links connecting the same two switches may exist. According to the ISL cluster with hierarchical connections of switches, all-to-all connections of switches can lead to faster communication with simpler configuration of switches.

In the example of FIG. 1, each of the plurality of nodes 104 represents a computing node configured to perform communication with another computing node through the all-to-all ISL cluster 102. For example, the computing node may include a server computing device, an accelerator device, a storage device, a memory device, and so on. Depending on the specific implementation, one or more nodes 104 are connected to each of the switches of the all-to-all ISL cluster 102.

Figure 2:
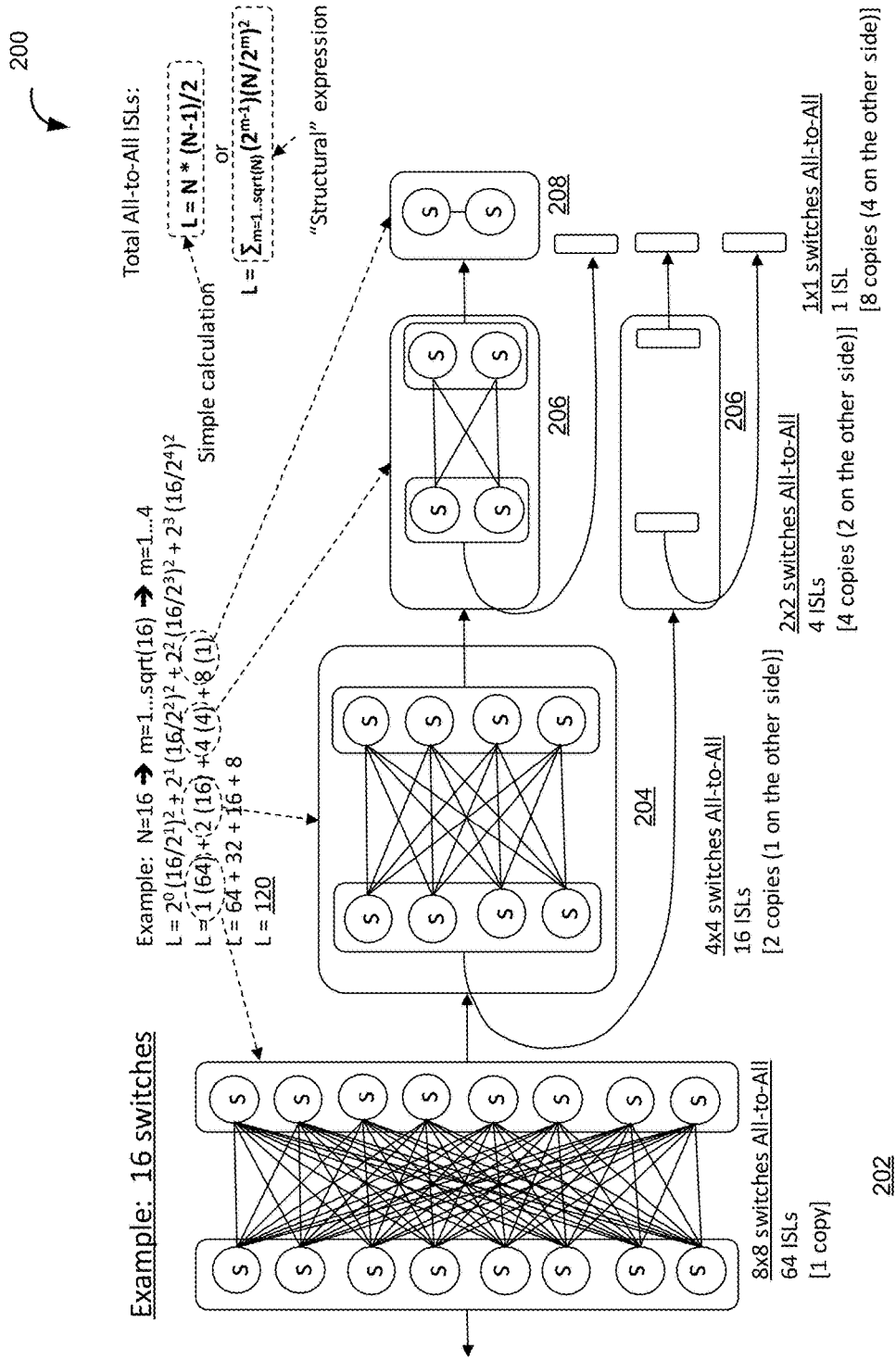
FIG. 2 is a conceptual diagram illustrating an example of hierarchical grouping of switches for achieving all-to-all connections according to some embodiments.

FIG. 2 is a conceptual diagram 200 illustrating an example of hierarchical grouping of switches for achieving all-to-all connections according to some embodiments. The conceptual diagram 200 is intended to illustrate hierarchical levels for achieving all-to-all connections among switches with optical links. In FIG. 2 example, the number of switches is 16 for illustrative purposes. The hierarchical levels for achieving all-to-all connections include a highest hierarchical level (first hierarchical level) 202, a second highest hierarchical level (second hierarchical level) 204, a second lowest hierarchical level (third hierarchical level) 206, and a lowest hierarchical level (fourth hierarchical level) 208.

In the highest hierarchical level (first hierarchical level) 202, all-to-all connections between switches in a first part of the whole switches and switches in a second part of the whole switches are established. In the example of FIG. 2, each of eight switches on the left (e.g., the first part) is connected to all of eight switches on the right (e.g., second part). The number of optical links to achieve the all-to-all connection in the highest hierarchical level 202 is (the number of switches in the first part)×(the number of switches in the second part). In the example of FIG. 2, the number of optical links in the highest hierarchical level 202 is 8×8=64.

In the second highest hierarchical level (second hierarchical level) 204, all-to-all connections between switches in a first subpart and switches in a second subpart, for each of the first part and second part of the whole switches are established. In the example of FIG. 2, for convenience of illustration, only the first part of the whole switches is illustrated, and the second part is omitted. In the example of FIG. 2, each of four switches on the left (e.g., the first subpart) is connected to all of four switches on the right (e.g., second subpart). The number of optical links to achieve the all to all connection in the second highest hierarchical level 204 is (the number of switches in the first subpart)×(the number of switches in the second subpart)×(the number of parts of the whole switches). In the example of FIG. 2, the number of optical links in the second highest hierarchical level 204 is 4×4×2=32, assuming that the number of switches in the subparts is all four.

In the second lowest hierarchical level (third hierarchical level) 206, all-to-all connections between switches in a first portion and switches in a second portion, for each of the subparts are established. In the example of FIG. 2, each of two switches on the left (e.g., the first portion) is connected to each of two switches on the right (e.g., second portion). The number of optical links to achieve the all-to-all connection in the second lowest hierarchical level 206 is (the number of switches in the first portion)×(the number of switches in the second subpart)×(the number of subpart). In the example of FIG. 2, the number of optical links in the second lowest hierarchical level 206 is 2×2×4=16, assuming that the number of switches in the portions is all two.

In the lowest hierarchical level (fourth hierarchical level) 208, one-to-one connections between switches in each of the portions is established. In the example of FIG. 2, one switch on the top is connected to one switch on the bottom. The number of optical links to achieve the all-to-all connection in the lowest hierarchical level 208 is equal to the number of the portions. In the example of FIG. 2, the number of optical links in the lowest hierarchical level 208 is 8. As a result, the total number of optical links for achieving the all-to-all connections among the whole switches is 64+32+16+8=120. In general, when the number of switches in the next lower hierarchical level is a half of the current hierarchical level in each of the plurality of hierarchical level, the total number of optical links for achieving the all-to-all connections can be expressed as $L=N(N-1)/2$. Here, L is the total number of optical links, and N is the total number of switches. The total number of optical links can be also expressed as $L=\Sigma_1^{\sqrt{N}}(2^{m-1})(N/2^m)^2$. The number of hierarchical levels correspond to $\sqrt{N}$.

In the example of FIG. 2, the total number of switches included in the topology may be a power of two, e.g., $2^n$ ($n \geq 4$). However the total number of switches is not limited to a power of two and may not be the power of two, e.g., 24, 31, etc. Similarly, in the example of FIG. 2, the number of each part in the highest hierarchical level 202 is a power of two, e.g., $2^{n-1}$ ($n \geq 4$). However the number of switches in each part in the highest hierarchical level 202 is not limited to a power of two and may not be a power of two. Further, the numbers of switches in the two parts in the highest hierarchical level 202 may be different, for example, 16 and 32, respectively. The same is true for the subpart in the second lowest hierarchical level 206, and the portion in the lowest hierarchical level 208. For the total number of switches of a power of two, the number of hierarchical levels is for the lowest level to get to 1-to-1, as the number of switches is halved at every lower level. In the example of FIG. 2, the number of the hierarchical levels is four, but the number of the hierarchical levels is not limited to four, and may be greater or smaller than four, depending on the total number of switches. In the example of FIG. 2, the number of switches in the lowest hierarchical level 208 is two, and one-to-one connection is established between the two switches.

In other examples, the total number of switches may not be a power of two. For an optimal application, the total number of switches is an even number. When the total number of switches is not a power of two, the number of switches all-to-all connected at the lowest hierarchical level may be 2 as well as 3. Regardless of the total number of switches having power of two or not, each switch tray may contain the same number of switch chips for optimal system configuration. Variations on the number of switches to be all-to-all connected at the lowest hierarchical level may be done within the shuffle trays. Although it will be optimal for product realization to have the same switch design for all switch trays to have the same switch chip count, even number of total switch trays, even number of switches in each switch tray, and a power-of-two switches in each switch tray, all these attributes are not limitation by this invention. Therefore, odd number of total switch trays, odd number of switch trays on either one or both sides, and odd number of switch chips in one or more of the switch trays are possible.

Figure 3:
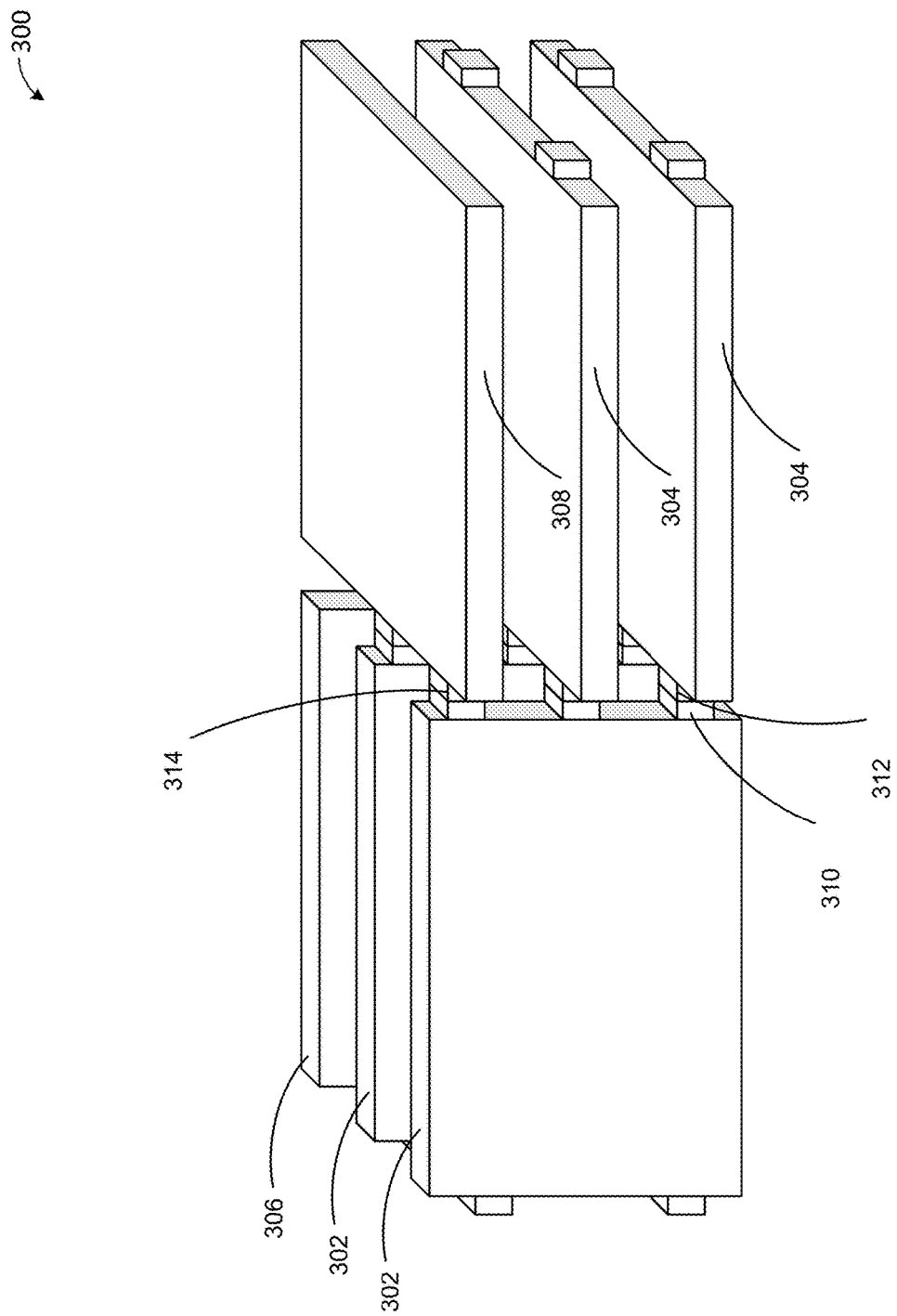
FIG. 3 is a schematic cubic diagram illustrating an external view of an example of an inter-switch link cluster for achieving all-to-all optical connections of optical inter-links of switches according to some embodiments.

FIG. 3 is a schematic cubic diagram 300 illustrating an external view of an example of an inter-switch link (ISL) cluster for achieving all-to-all connections of optical inter-links of switches according to some embodiments. In the example shown in FIG. 3, the ISL cluster includes a first array of switch trays 302, a second array of switch trays 304, a first shuffle tray 306, and a second shuffle tray 308. In the example shown in FIG. 3, it is assumed that a total number of switches in the ISL cluster is 16.

In the example of FIG. 3, the first array of switch trays 302 is a plurality of first switch trays arranged in a first orientation. Each of the first switch trays includes a plurality of switches therein and interconnected to each other, establishing all-to-all connections therein. In the example of FIG. 3, each of the first switch trays includes four switches interconnected to each other. A detailed configuration of a switch tray will be described below with reference to FIG. 4. Each of the first switch trays includes a plurality of first optical connectors 310 (e.g., blind-mate connectors) for connection with the second array of switch trays 304 and the second shuffle tray 308.

In the example of FIG. 3, the second array of switch trays 304 is a plurality of second switch trays arranged in a second orientation different from the first orientation. In a specific implementation, the second orientation is orthogonal to the first orientation, such that the ISL cluster is formed in a cubic shape. Depending on the specific implementation, the configuration of the second switch tray may be the same or different from that of the first switch tray. Each of the second switch trays includes a plurality of second optical connectors 312 (e.g., blind-mate connectors) for connection with the first array of switch trays 302 and the first shuffle tray 306 through the plurality of first optical connectors 310.

In some embodiments, all-to-all connections in the highest hierarchical level between switches included in the first array of switch trays 302 and switches included in the second array of switch trays 304 is established through the connection between the first optical connectors 310 and the second optical connectors 312. Specifically, each of the first optical connectors 310 in a first switch tray is connected to one of the plurality of second optical connectors 312 in different one of the plurality of second switch trays.

In the example of FIG. 3, the first shuffle tray 306 is a tray including an optical shuffle for connection in the next highest hierarchical level between switches included in a first part of the second switch trays (e.g., the bottom second switch tray in FIG. 3) and switches included in a second part of the second switch trays (e.g., the top second switch tray in FIG. 3). The first shuffle tray 306 is arranged along the first array of switch trays 302. The first shuffle tray 306 may have the same or similar dimension as the first switch tray. A detailed configuration of a shuffle tray will be described below with reference to FIG. 5. The first shuffle tray 306 includes a plurality of optical connectors (not shown in FIG. 3) for connection with the second array of switch trays 304, respectively. In some embodiments, all-to-all connections in the next highest hierarchical level between switches in one of the second switch trays and switches in the other of the second switch trays is established through the first shuffle tray 306.

In the example of FIG. 3, the second shuffle tray 308 is a tray including an optical shuffle to establish a connection, in the next highest hierarchical level, between switches included in a first part of the first switch trays (e.g., the front first switch tray 302 in FIG. 3) and switches included in a second part of the first switch trays (e.g., the rear first switch tray 302 in FIG. 3). Depending on the specific implementation, the configuration of the second shuffle tray 308 may be the same or different from that of the first shuffle tray 306. The second shuffle tray 308 includes a plurality of optical connectors 314 for connection with the first array of switch trays 302, respectively. In some embodiments, all-to-all connections in the next highest hierarchical level between switches in one of the first switch trays and switches in the other of the first switch trays is established through the second shuffle tray 308.

In some embodiments, the ISL cluster shown in FIG. 3 may be housed in a switch chassis, such that optical connection through the first optical connectors 310, the second optical connectors 312, and the optical connectors 314 is maintained without causing offset of optical connection. The switch chassis may include opening for exposing optical connectors for connection with external computing nodes.

Figure 4:
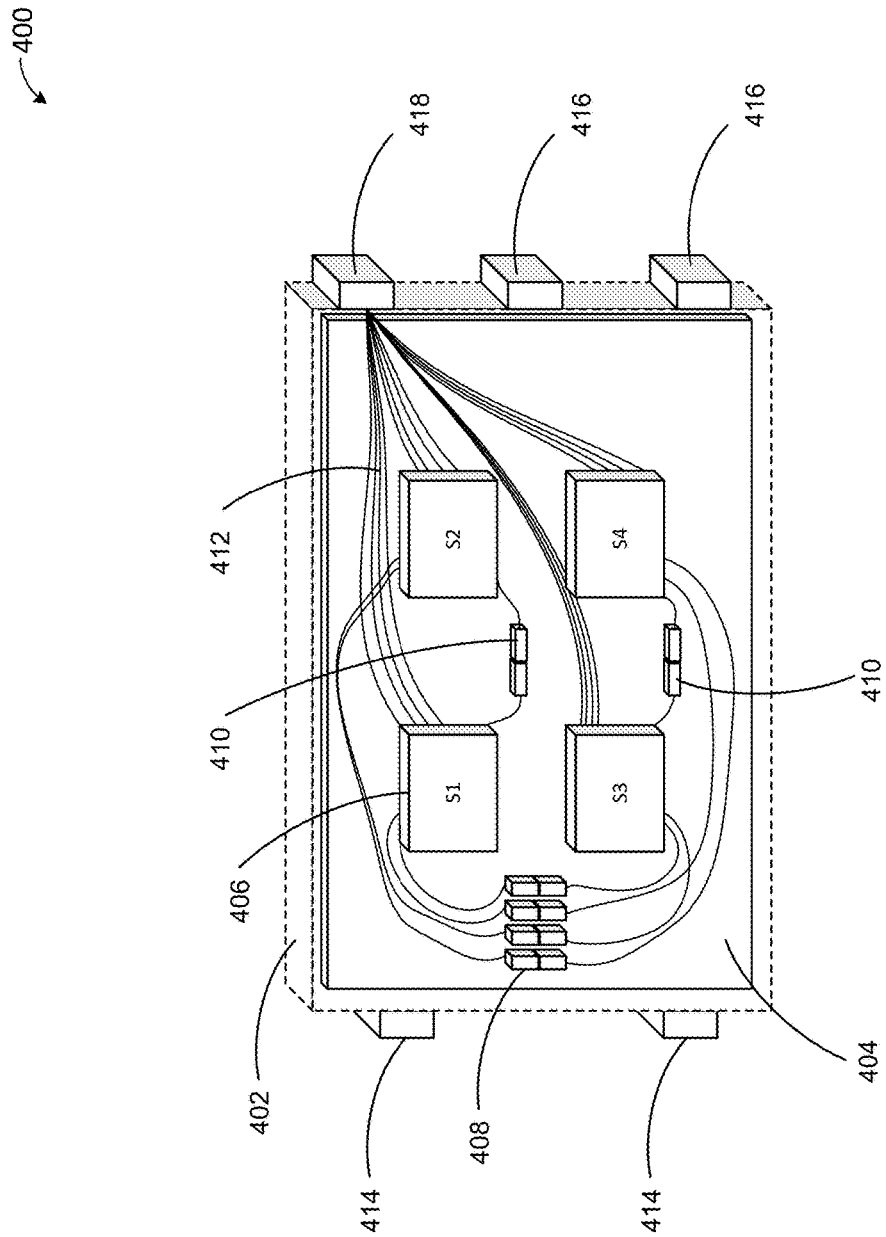
FIG. 4 is a schematic diagram illustrating a perspective view of an example of internal architecture of a switch tray included in an inter-switch link cluster according to some embodiments.

FIG. 4 is a schematic diagram 400 illustrating a perspective view of an example of an internal architecture of a switch tray included in an inter-switch link according to some embodiments. In the example shown in FIG. 4, the switch tray includes a switch tray housing 402, a switch base 404, a plurality of switch chips 406, a plurality of 1-to-1 optical connectors 410, and a plurality of 2-to-2 optical connectors 408, a plurality of optical cables 412, one or more external faceplate optical connectors 414, a plurality of first internal optical connectors 416 (e.g., blind-mate connectors), and one or more second internal optical connectors 418. In some embodiments, the switch tray depicted in FIG. 4 corresponds to one or both of the first switch tray and the second switch tray depicted in FIG. 3.

In the example of FIG. 4, the switch tray housing 402 represents a housing in which primary optical components of the switch tray, such as the switch chips 406, the 1-to-1 optical connectors 410, the 2-to-2 optical connectors 408, and the optical cables 412, are accommodated. The switch tray housing 402 may be formed of applicable materials such as resin, metal, a composite material thereof, etc.

In the example of FIG. 4, the switch base 404 is a base board (e.g., a printed circuit board (PCB)) on which the primary components of the switch tray are disposed. In some embodiments, the switch base 404 is fixed to and enclosed by the switch tray housing 402. The switch base 404 may be formed of applicable materials such as resin, metal, glass, silicon, a composite material thereof, etc.

In the example of FIG. 4, a switch chip 406 is an optical component configured to route an input optical signal from an optical cable 412 to another optical cable 412 as an output signal. Depending on a specific implementation, the switch chip 406 may include one or more reflectors (e.g., mirrors), one or more optical ring modulators, one or more optical waveguides, one or more grating couplers, one or more optical filters, one or more photos receptor, one or more photodiodes, and one or more electronic logic die on a silicon interposer. A chip may be a semiconductor chip formed of a silicon substrate and/or organic substrate. In some embodiments, when all-to-all switch connections are established, optical cables 412 of [(the total number of switches)−1] extend from each of the switch chips 406 for inter-switch links. In the example of FIG. 4, 15 optical cables 412 extend from each switch chip 406, and one of the optical cables 412 extends to one of the 1-to-1 optical connectors 410 for all-to-all connections in the lowest hierarchical level. Two of the optical cables 412 extend to two of the 2-to-2 optical connectors 408, four of the optical cables 412 extend to the second internal optical connector 418, and four of the optical cables 412 extend to each of the first internal optical connectors 416.

In the example of FIG. 4, four switch chips 406 are arranged on the switch base 404. However, the number of switch chips 406 in the switch tray may be greater than four (e.g., 8) or smaller than four (e.g., 2). Depending on a specific implementation, some of the switch chips 406 may be disposed on one surface of the switch base 404, and the other of the switch chips 406 may be disposed on the opposite surface of the switch base 404.

In the example of FIG. 4, each of the 1-to-1 optical connectors 410 is an optical coupling element configured to couple one optical cable 412 extending from one of the switch chips 406 with another one optical cable 412 extending from another one of the switch chips 406. In some embodiments, the 1-to-1 optical connectors 410 are disposed to establish all-to-all connections in the lowest hierarchical level. In the example of FIG. 4, two pairs of 1-to-1 optical connectors 410 are disposed on the switch base 404. A pair of 1-to-1 optical connectors 410 couples between the top two switch chips 406 (S1 and S2) and another pair of 1-to-1 optical connectors 410 between the bottom two switch chips 406 (S3 and S4).

In the example of FIG. 4, each of the 2-to-2 optical connectors 408 is an optical coupling element configured to couple one optical cable 412 extending from one of the switch chips 406 with another one optical cable 412 extending from another one of the switch chips 406. In some embodiments, the 2-to-2 optical connectors 410 are disposed to establish all-to-all connections in the second lowest hierarchical level. In the example of FIG. 4, four pairs of 2-to-2 optical connectors 408 are disposed on the switch base 404, and the two pairs of the 1-to-1 optical connectors 410 couple between one of the top two switch chips 406 (S1 and S2) and one of the bottom two switch chips 406 (S3 and S4). In some embodiments, the 1-to-1 optical connector 410 and/or the 2-to-2 optical connector 408 comprises an optical ferrule detachably coupled to the corresponding optical connector.

In the example of FIG. 4, the plurality of optical cables 412 are disposed on the switch base 404 for optical connection. The optical cables 412 may be embedded in the switch base 404 or routed on top of surfaces of the switch base 404. The optical cables 412 may include those for the inter-switch links discussed above and those for external connection with nodes. The optical cables 412 may be formed of any applicable cables, such as optical fibers, and a transmission mode of optical signals therein is not particularly limited.

In the example of FIG. 4, the one or more external optical connectors 414 are optical connectors that connect with external computational nodes, such as server computing devices. In some embodiments, the external optical connectors 414 may be disposed on a side edge of the switch tray housing 402. For example, a single external optical connector 414 serves for optical connections between each of a part of the switch chips 406 (e.g., S1 and S2) and one or more corresponding external computational nodes. The number of external optical connectors 414 may be one, two, or greater than two.

In the example of FIG. 4, the plurality of first internal optical connectors 416 are optical connectors for connection with other switch trays. The internal optical connectors 416 may be blind-mate connectors. In some embodiments, the first internal optical connectors 416 may be disposed on a side edge of the switch tray housing 402 opposite to a side edge of the switch tray housing 402 on which the external optical connectors 414 are disposed. Although not illustrated in FIG. 4, optical cables 412 extend from each of first internal optical connectors 416 to each of the switch chips 406. In some embodiments, the first internal optical connectors 416 are disposed to establish all-to-all connections in the highest hierarchical level.

In the example of FIG. 4, each of the one or more second internal optical connectors 418 is an optical connector used to establish connections to a shuffle tray. In some embodiments, the second internal optical connectors 418 may be disposed on a side edge of the switch tray housing 402 on which the first internal optical connectors 416 are disposed. In some embodiments, the second internal optical connectors 418 are disposed to establish all-to-all connections in the second highest hierarchical level.

Figure 5:
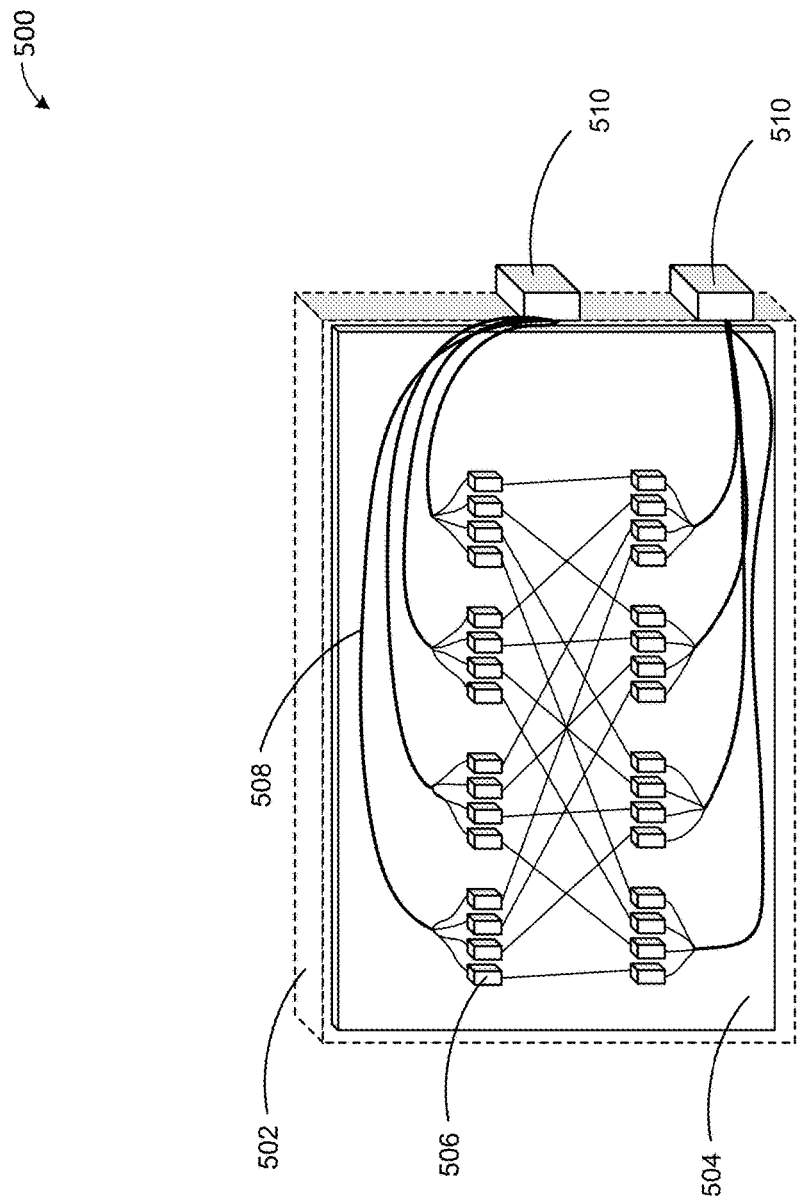
FIG. 5 is a schematic diagram illustrating a perspective view of an example of internal architecture of a shuffle tray included in an inter-switch link cluster according to some embodiments.

FIG. 5 is a schematic diagram 500 illustrating a perspective view of an example of internal architecture of a shuffle tray included in an inter-switch link according to some embodiments. In the example shown in FIG. 5, the shuffle tray includes a shuffle tray housing 502, a shuffler base 504, a plurality of shuffling optical connectors 506, a plurality of optical cables 508, and a plurality of optical connectors 510. In some embodiments, the shuffle tray depicted in FIG. 5 corresponds to one or both of the first shuffle tray 306 and the second shuffle tray 308 depicted in FIG. 3.

In the example of FIG. 5, the shuffle tray housing 502 represents a housing in which primary optical components of the shuffle tray, such as the shuffling optical connectors 506 and the optical cables 508, are accommodated. The shuffle tray housing 502 may be formed of applicable materials such as resin, metal, a composite material thereof, etc. The shuffle tray housing 502 may have the same or similar configuration as the switch tray housing 402 depicted in FIG. 4.

In the example of FIG. 5, the shuffler base 504 is a base board on which the primary components of the shuffle tray are disposed. In some embodiments, the shuffler base 504 is fixed to and enclosed by the shuffle tray housing 502. The shuffler base 504 may be formed of applicable materials such as resin, metal, glass, silicon, a composite material thereof, etc., and may have the same or similar configuration as the switch base 404 depicted in FIG. 4.

In the example of FIG. 5, each of the shuffling optical connectors 506 is an optical coupling element configured to optically couple an optical cable 508 with another optical cable 508. In some embodiments, the shuffling optical connectors 506 are disposed on the shuffler base 504. In some embodiments, the shuffling optical connectors 506 are disposed to establish all-to-all connections in at least the second highest hierarchical level. Depending on the specific implementation, the shuffling optical connectors 506 may further configured to establish all-to-all connections in one or more hierarchical levels lower than the second highest hierarchical level. In the example of FIG. 5, the shuffling optical connectors 506 are disposed on the shuffler base 504.

In the example of FIG. 5, the plurality of optical cables 508 are disposed on the shuffler base 504 for optical connection. The optical cables 508 may be embedded in the shuffler base 504 or routed on top of surfaces of the shuffler base 504. The optical cables 508 may include those for external connection with switch trays. The optical cables 508 may be formed of any applicable cables, such as optical fibers, and a transmission mode of optical signals therein is not particularly limited. Depending on the specific implementation, the shuffling optical connectors 506 and the optical cables 508 may be disposed on one or both surfaces of the shuffler base 504. For example, shuffling optical connectors 506 and optical cables 508 for the second highest hierarchical level may be disposed on one surface of the shuffler base 504. Also, shuffling optical connectors 506 and optical cables 508 for the third highest hierarchical level may be disposed on the opposite surface of the shuffler base 504.

In the example of FIG. 5, the plurality of optical connectors 510 are optical connectors for connection with switch trays, such as the switch tray depicted in FIG. 4. In some embodiments, the optical connectors 510 may be disposed on a side edge of the shuffle tray housing 502. For example, a single optical connector 510 serves for optical connections with an internal optical connector (e.g., the second internal optical connector 418 in FIG. 4) of a switch tray. The number of optical connectors 510 may correspond to the number of switch trays arranged along the optical connectors 510.

Figure 6:
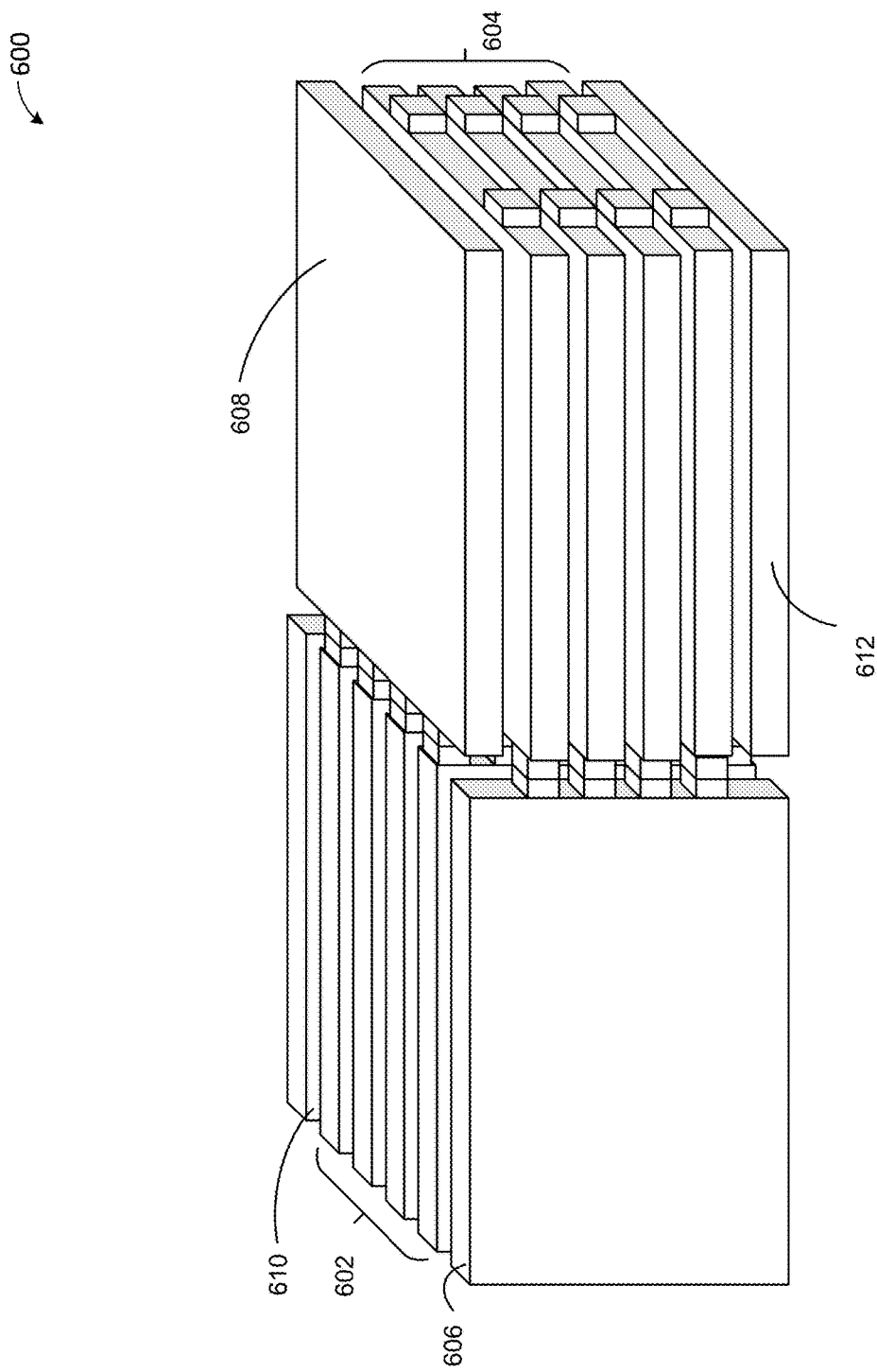
FIG. 6 is a schematic cubic diagram illustrating an external view of another example of an inter-switch link cluster for achieving all-to-all connections of optical inter-links of switches according to some embodiments.

FIG. 6 is a schematic cubic diagram 600 illustrating an external view of another example of an inter-switch link (ISL) for achieving all-to-all connections of optical interlinks of switches according to some embodiments. The ISL cluster depicted in FIG. 6 is directed to establishing all-to-all connections among 32 switches (four switches in each switch tray and four switch trays in each side), although the internal structure thereof are not shown in FIG. 6 for illustrative purpose. The ISL cluster depicted in FIG. 6 includes a first array of switch trays 602, a second array of switch trays 604, a first shuffle tray 606, a second shuffle tray 608, a third shuffle tray 610, and a fourth shuffle tray 612. The configuration of the ISL cluster depicted in FIG. 6 is substantially the same as that of the ISL cluster depicted in FIG. 3, and therefore features different from the ISL cluster depicted in FIG. 3 will be primarily described below.

In the example of FIG. 6, the first array of switch trays 602 includes four first switch trays arranged in a first orientation, and each of the first switch trays includes four switch chips therein interconnected to each other (e.g., in the lowest and the second lowest hierarchical levels). In the example of FIG. 6, the second array of switch trays 604 similarly includes four second switch trays arranged in a second orientation, and each of the second switch trays includes four switch chips therein interconnected to each other (e.g., in the lowest and the second lowest hierarchical levels). Connection between the first array of switch trays 602 and the second array of switch trays 604 at intersections thereof comprises all-to-all connections in the highest hierarchical level.

In the example of FIG. 6, the first shuffle tray 606 includes a plurality of shuffling optical connectors for connecting switch chips in a first part of the second array of switch trays 604 (e.g., the top two trays) to switch chips in a second part of the second array of switch trays 604 (e.g., the bottom two trays).

In the example of FIG. 6, the second shuffle tray 608 similarly includes a plurality of shuffling optical connectors for connecting switch chips in a first part of the first array of switch trays 602 (e.g., the front two trays) to switch chips in a second part of the first array of switch trays 602 (e.g., the rear two trays). Connection between the first part of the first array of switch trays 602 and the second part of the first array of switch trays 602 and between the first part of the second array of switch trays 604 and the second part of the second array of switch trays 604 comprise all-to-all connections in the second highest hierarchical level.

In the example of FIG. 6, the third shuffle tray 610 includes a plurality of shuffling optical connectors for connecting switch chips in a first subpart of the first part of the second array of switch trays 604 (e.g., the top array) and switch chips in a second subpart of the first part of the second array of switch trays 604 (e.g., the second top array). The third shuffle tray 610 also includes a plurality of shuffling optical connectors for connecting switch chips in a first subpart of the second part of the second array of switch trays 604 (e.g., the third top array) and switch chips in a second subpart of the second part of the second array of switch trays 604 (e.g., the bottom array).

In the example of FIG. 6, the fourth shuffle tray 612 includes a plurality of shuffling optical connectors for connecting switch chips in a first subpart of the first part of the first array of switch trays 602 (e.g., the front array) and switch chips in a second subpart of the first part of the first array of switch trays 602 (e.g., the second front array). The fourth shuffle tray 612 also includes a plurality of shuffling optical connectors for connecting switch chips in a first subpart of the second part of the first array of switch trays 602 (e.g., the third front array) and switch chips in a second subpart of the second part of the first array of switch trays 602 (e.g., the rear array). Connection through the third shuffle tray 610 and the fourth shuffle tray 612 comprise all-to-all connections in the third highest hierarchical level.

In some embodiments, there may be more than two shuffle trays on each side of the switch chassis. Multiple shuffle trays on each side of the switch chassis may be grouped together, positioned on the ends, or interleaved with switch trays. In some embodiments one or more of the multiple shuffle trays may be used for different purposes. In one example, a shuffle tray may be employed to hold a hierarchical level of connections, and another shuffle tray may be employed to hold a lower level of connections.

Figure 7:
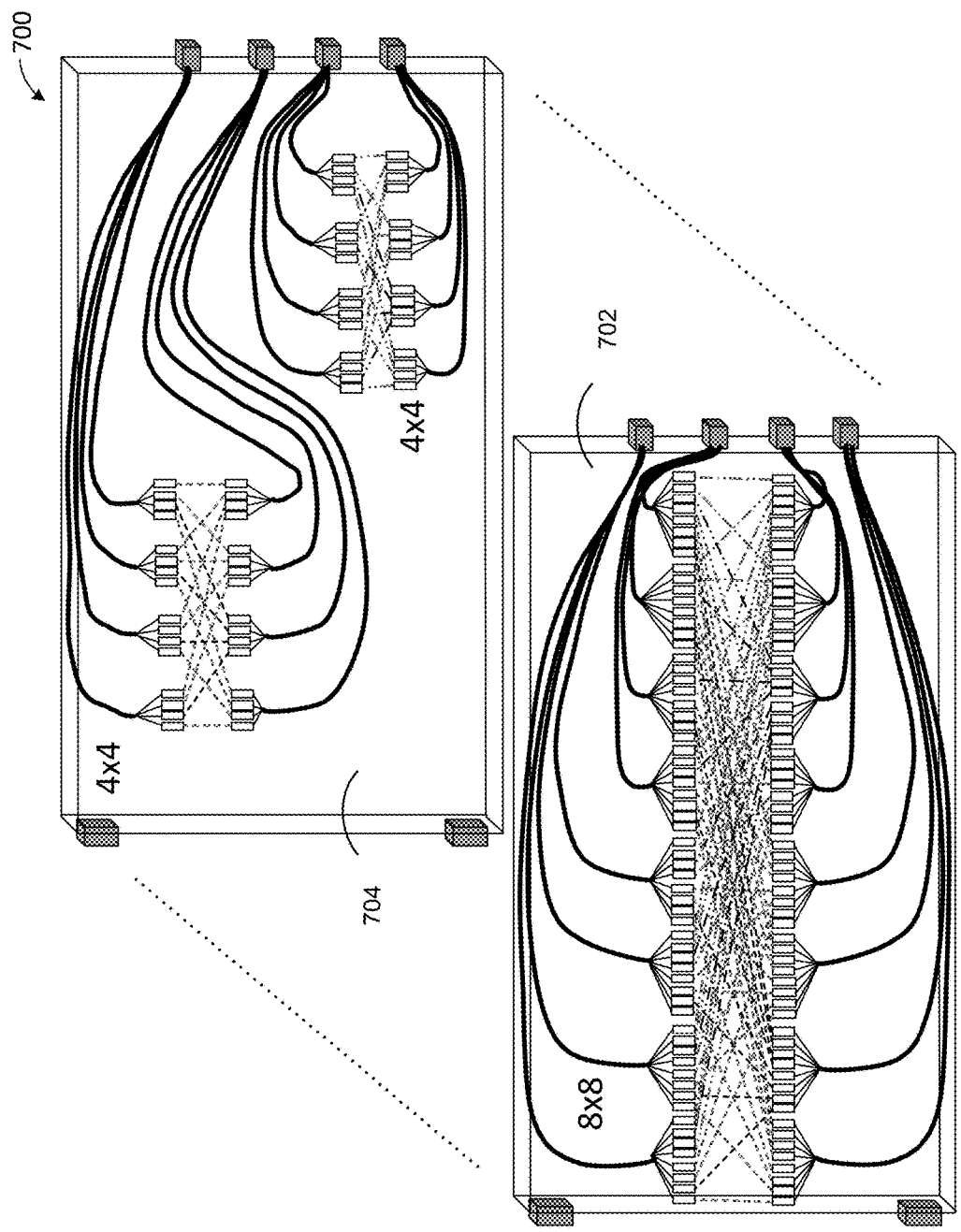
FIG. 7 is a schematic transparent diagram illustrating a perspective view of an example of shuffle trays arranged at ends of an array of switch trays.

FIG. 7 is a schematic transparent diagram 700 illustrating a perspective view of an example of shuffle trays 702, 704 arranged at ends of an array of switch trays, similar to the example illustrated in FIG. 6. The shuffle trays 702, 704 are similar to the shuffle trays 606, 610 illustrated in FIG. 6. The switch trays and the other-side shuffle trays are not shown in FIG. 7 for clarity. In FIG. 7, it is assumed that four switch trays are arranged on each side and interconnected at cross section of the switch trays (similar to the switch trays in FIG. 6), and each switch tray includes four switch chips. That is, in total 32 switch chips in eight switch trays establish all-to-all connections. As shown, the shuffle trays include a shuffle tray 702 and a shuffle tray 704 arranged at ends of an array of four switch trays arranged in a horizontal direction (not shown). The shuffle tray 702 is provided for establishing all-to-all connections between eight switch chips in two switch trays (e.g., a first part) arranged vertically at the other side and other eight switch chips in another two switch trays (e.g., a second part) arranged vertically at the other side. The shuffle tray 704 is provided for establishing all-to-all connections between four switch chips in one switch tray (e.g., a first subpart of a first part) and other four switch chips in another switch tray (e.g., a second subpart of the first part), with respect to each part of switch trays arranged on the other side. FIG. 7 is an example illustrating a hierarchical level of connections are held by the shuffle tray 702 and two lower hierarchical levels of connections are held by the shuffle tray 704.

According to an ISL cluster of some embodiments, all-to-all connections of switches can be achieved by employing different connection manners of different hierarchical levels, including the intersectional connections of arrays of switch trays (hereinafter "intersectional connection"), the connection through shuffle trays (hereinafter "shuffle tray connection"), and the connection in a switch tray (hereinafter "in-tray connection"). Depending on the number of switches (i.e., switch chips), the number of switch trays, the number of switches in each switch tray, various combination of the connection at different hierarchical levels can be applied. FIG. 8 is a chart 800 illustrating variations of different connection manners at different hierarchical levels according to some embodiments. In FIG. 8, "switches" represent the total number of switches included in the ISL cluster, "switch trays" represent the arrangement of switch trays in the ISL cluster, and "switches per tray" represents the number of switches in each switch tray. The terms "intersectional," "shuffle tray," and "in-tray" represent the intersectional connection, the shuffle tray connection, and the in-tray connection, respectively, and the numbers in the columns of "intersectional," "shuffle tray," and "in-tray" represent the hierarchical levels. The lower the number, the higher the hierarchical level. In an embodiment, the shuffle tray connections may be in a shuffle tray for each (of the first and the second) array of switch trays. In another embodiment, the shuffle tray connections may be split across multiple shuffle trays. For example, for 32 switches, the hierarchical level 2 may be in a shuffle tray and the hierarchical level 3 may be in another shuffle tray for an array of switch trays. As shown in FIG. 8, all-to-all connections of switches can be achieved by combination of different connection manners of the intersectional connection, the shuffle tray connection, and the in-tray connection at different hierarchical levels with different number of switches, different switch tray arrangements, and different number of switches per switch tray. Because of the all-to-all connections of switches, the number of fiber stages, and fiber counts for optical connection can be reduced, which may leads to lower cost, lower optical power loss, and high density of switches.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments. Alternatively, one or more embodiments necessarily include logic for deciding, with or without user input or prompting, whether these features, elements and/or steps are included or are to be performed in any particular embodiment.

The invention claimed is:

1. An optical inter-switch link (ISL) cluster comprising:
   an array of first switch trays arranged in a first orientation, each of the first switch trays including a plurality of first switch chips disposed thereon and connected to each other through optical cables thereon;
   a plurality of first optical connectors connector to the plurality of first switch chips;
   an array of second switch trays arranged in a second orientation different from the first connection, each of the second switch trays including a plurality of second switch chips disposed thereon and connected to each other through optical cables thereon;
   a plurality of second optical connectors connected to the plurality of second switch chips;
   a first shuffle tray arranged along the array of first switch trays, the first shuffle tray including a plurality of optical cables configured to connect each of the plurality of second switch chips on a first part of the second switch trays to all of the plurality of second switch chips on a second part of the second switch trays; and
   a second shuffle tray arranged along the array of second switch trays, the second shuffle tray including a plurality of optical cables configured to connect each of the plurality of first switch chips on a first part of the first switch trays to all of the plurality of first switch chips on a second part of the first switch tray; and
   each of the plurality of first optical connectors connected to each of the first switch trays being connected to one of the plurality of second optical connectors of a different one of the plurality of second switch trays.

2. The optical ISL cluster of claim 1, wherein each switch chip in the plurality of first switch chips and the plurality of second switch chips is connected to all of the other switch chips in the plurality of first switch chips and the plurality of second switch chips in a direct manner without passing through another switch chip.

3. The optical ISL cluster of claim 1, wherein the number of first switch trays in the first part of the first switch trays is equal to the number of first switch trays in the second part of the first switch trays, and the number of second switch trays in the first part of the second switch trays is equal to the number of second switch trays in the second part of the second switch trays.

4. The optical ISL cluster of claim 1, further comprising:
a third shuffle tray arranged along the array of first switch trays, the third shuffle tray including a plurality of optical cables configured to connect each of the plurality of second switch chips on a first subpart of the first part of the second switch trays to all of the plurality of second switch chip on a second subpart of the first part of the second switch trays; and
a fourth shuffle tray arranged along the array of second switch trays, the fourth shuffle tray including a plurality of optical cables configured to connect each of the plurality of first switch chips on a first subpart of the first part of the first switch trays to all of the plurality of first switch chips on a second subpart of the first part of the first switch trays.

5. The optical ISL cluster of claim 4, wherein the plurality of optical cables of the third shuffle tray are further configured to connect each of the plurality of second switch chips on a first subpart of the second part of the second switch trays to all of the plurality of second switch chips on a second subpart of the second part of the second switch trays; and
the plurality of optical cables of the fourth shuffle tray are further configured to connect each of the plurality of first switch chips on a first subpart of the second part of the first switch trays to all of the plurality of first switch chips on a second subpart of the second part of the first switch trays.

6. The optical ISL cluster of claim 4, wherein the number of the first subpart of the first part of the first switch trays is equal to the number of the second subpart of the first part of the first switch trays, and the number of the first subpart of the first part of the second switch trays is equal to the number of the second subpart of the first part of the second switch trays.

7. The optical ISL of claim 1, wherein the number of the plurality of first switch chips in the array of first switch trays is equal to the number of the plurality of second switch chips in the array of second switch trays.

8. The optical ISL of claim 7, wherein the number of the first switch trays is equal to the number of the second switch trays.

9. The optical ISL cluster of claim 1, wherein each of the first switch trays further includes one or more external optical connectors for connection with one or more server nodes, and each of the second switch trays further includes one or more external optical connectors for connection with one or more server nodes.

10. A computing system comprising:
a plurality of server computing devices; and
an optical inter-switch link (ISL) cluster including a plurality of switch chips, each of the switch chips being connected to one or more of the server computing devices at least partially through an optical cable, the optical ISL cluster comprising:
an array of first switch trays arranged in a first orientation, each of the first switch trays including a plurality of first switch chips disposed therein and connected to each other through optical cables thereon;
a plurality of first optical connectors connected to the plurality of first switch chips;
an array of second switch trays arranged in a second orientation different from the first connection, each of the second switch trays including a plurality of second switch chips disposed thereon and connected to each other through optical cables thereon;
a plurality of second optical connectors connected to the plurality of second switch chip;
a first shuffle tray arranged along the array of first switch trays, the first shuffle tray including a plurality of optical cables configured to connect each of the plurality of second switch chips on a first part of the second switch trays to all of the plurality of second switch chips on a second part of the second switch trays; and
a second shuffle tray arranged along the array of second switch trays, the second shuffle tray including a plurality of optical cables configured to connected each of the plurality of first switch chips on a first part of the first switch trays to all of the plurality of first switch chips on a second part of the first switch tray;
each of the plurality of first optical connectors connected to each of the first switch trays being connected to one of the plurality of second optical connectors of a different one of the plurality of second switch trays.

11. The computing system of claim 10, wherein the optical ISL cluster further comprises:
a third shuffle tray arranged along the array of first switch trays, the third shuffle tray including a plurality of optical cables configured to connect each of the plurality of second switch chips on a first subpart of the first part of the second switch trays to all of the plurality of second switch chips on a second subpart of the first part of the second switch trays; and
a fourth shuffle tray arranged along the array of second switch trays, the fourth shuffle tray including a plurality of optical cables configured to connect each of the plurality of first switch chips on a first subpart of the first part of the first switch trays to all of the plurality of first switch chips on a second subpart of the first part of the first switch trays.

12. The computing system of claim 10, wherein the number of the plurality of first switch chips in the array of first switch trays is equal to the number of the plurality of second switch chips in the array of second switch trays.

13. The computing system of claim 12, wherein the number of the first switch trays is equal to the number of second switch trays.

14. A method for establishing all-to-all connections among a plurality of switch, the method comprising:
establishing optical connections between each of a first part of the plurality of switches disposed in an array of first switch trays arranged in a first orientation and all of a second part of the plurality of switches disposed in an array of second switch trays arranged in a second orientation different from the first orientation;
establishing optical connections between each of a first subpart of the second part of the switches and all of a second subpart of the second part of the switches using a first shuffle tray arranged along the array of first switch trays, the first shuffle tray including a plurality of optical cables configured to connect each of the plurality of second switch chips on a first part of the second switch trays to all of the plurality of second switch chips on a second part of the second switch trays;
establishing optical connections between each of a first subpart of the first part of the switches ad all of a second subpart of the first part of the switches using a second shuffle tray arranged along the array of second switch trays, the second shuffle tray including a plurality of optical cables configured to connect each of the plurality of first switch chips on a first part of the first switch trays to all of the plurality of first switch chips on a second part of the first switch trays;

establishing optical connections among switches in each of the first switch trays through optical cables disposed in each of the first switch trays; and establishing optical connections among switches in each of the second switch trays through optical cables disposed in each of the second switch trays.

15. The method of claim 14, wherein the number of the plurality of switches is $2^n$ ($n \geq 4$).

16. The method of claim 14, wherein the number of switches in the first part is equal to the number of switches in the second part.

17. The method of claim 16, wherein the number of switches in each of the first subpart and the second subpart of the first part is equal to the number of switches in each of the first subpart and the second subpart of the second part.

18. The method of claim 17, wherein the number of switches in each of the first switch trays is equal to the number of switches in each of the second switch trays.

* * * * *